United States Patent [19]

Lin et al.

[11] Patent Number: 4,743,503
[45] Date of Patent: May 10, 1988

[54] TITANATE/ORGANOSILANE COMPOSITIONS

[75] Inventors: Chia-Cheng Lin, Gibsonia; Thomas G. Rukavina, Lower Burrell, both of Pa.

[73] Assignee: PPG Industries, Inc., Pittsburgh, Pa.

[21] Appl. No.: 812,666

[22] Filed: Dec. 23, 1985

[51] Int. Cl.$^4$ .............................................. C09J 7/02
[52] U.S. Cl. ................................... 428/353; 428/412; 428/413; 428/447; 428/451
[58] Field of Search ............... 428/447, 451, 353, 412, 428/413; 204/38.4

[56] References Cited

U.S. PATENT DOCUMENTS

| | | | |
|---|---|---|---|
| 3,794,556 | 2/1974 | Young | 428/413 |
| 3,817,905 | 6/1974 | Lerner et al. | 106/1.17 |
| 4,059,473 | 11/1977 | Okami et al. | 428/429 |
| 4,272,588 | 6/1981 | Yoldas et al. | 428/433 |
| 4,278,632 | 7/1981 | Yoldas | 264/66 |
| 4,346,131 | 8/1982 | Yoldas | 428/35 |
| 4,361,598 | 11/1982 | Yoldas | 427/74 |
| 4,396,650 | 8/1983 | Lange et al. | 427/409 |

Primary Examiner—Edith Buffalow
Attorney, Agent, or Firm—Donna L. Seidel

[57] ABSTRACT

A titanate/organosilane copolymer is disclosed for use as a primer to promote adhesion between a rigid polymer substrate and an elastomeric interlayer or inorganic coating, or as a release agent to prevent such adhesion depending on the nature of the organic moiety of the organosilane.

12 Claims, No Drawings

TITANATE/ORGANOSILANE COMPOSITIONS

The present invention relates generally to the art of altering the surface properties of substrates, and more particularly to the art of primers which increase and release agents which decrease the adherence of various materials to glass, plastic, metal or oxide surface substrates.

The present invention provides titanate/organosilane polymers which can be effective either to promote or to prevent adhesion of coatings to substrates depending on the nature of the organic moiety of the polymer. Titanate/organosilane primers of the present invention are useful in promoting adhesion of an organic film, e.g. a vinyl interlayer, to such surfaces as polyacrylate for example stretched acrylic or a metal oxide coated stretched acrylic substrate. Titanate/organosilane release agents of the present invention are useful in preventing adhesion of inorganic coatings such as siloxanes to plastic surfaces.

The compositions of the present invention comprise both titanate and organosilane moieties. A titanate/organosilane primer in accordance with the present invention may be formulated simply by dissolving or partially hydrolyzing appropriate titanate and organosilane compounds, preferably titanium tetraalkoxides and trialkoxyorganosilanes, in a suitable solvent. Organic solvents such as alcohols are preferred, particularly isopropanol.

A preferred primer in accordance with the present invention comprises tetrabutyl titanate and trialkoxyorganosilane dissolved in 2-propanol. An equimolar mixture of tetrabutyl titanate and trialkoxy organosilane dissolved in 2-propanol at a concentration of about one half to one percent is a particularly preferred primer.

A solution of titanate/organosilane primer in accordance with the present invention may be applied to a substrate surface by any convenient means such as dipping or spraying. Flow coating is a preferred method of application. The primer of the present invention may be applied at ambient temperature. The solvent may be evaporated at ambient temperature, or evaporation may be accelerated by heating. However, heat curing of the titanate/organosilane primer of the present invention is not necessary.

The preparation of titanate/organosilane polymers of the present invention is based on the following reaction sequence. First, the trialkoxyorganosilane is hydrolyzed.

Then the hydrolyzed organosilane reacts with the tetraalkoxy titanium compound.

The organic moiety R can be any of a wide range of organic groups, depending on the desired properties of the composition. The number of organic moieties R may be from 1 to 3, again depending on the desired properties. R' is preferably methyl or ethyl, but may be propyl, butyl or higher homologs if the reaction is acid catalyzed. R'' is preferably butyl.

In a most preferred embodiment of the present invention, the mole ratio of silane to water is about one and the mole ratio of silane to titanate is also about one. The most preferred titanate is tetrabutyl titanate, and preferred silanes are trimethoxy and triethoxy organosilanes. The reactions are preferably catalyzed with inorganic acids such as hydrochloric or nitric acid.

The present invention will be further understood from the description of specific examples which follow.

EXAMPLE I

A titanate/organosilane composition was prepared by hydrolyzing 24.84 grams of methacryloxypropyltrimethoxysilane in 100 grams of 2-propanol containing 1.8 grams of water. The solution was heated to and held for 15 minutes at 50° C. Then 28.4 grams of tetrabutyltitanate was added, and the reaction mixture maintained at 50° C. for an additional 20 minutes. The clear solution of titanate/organosilane thus formed is useful as a primer in aircraft transparencies because the methacryloxypropyl organic moiety promotes adhesion of coatings to an acrylic substrate surface.

EXAMPLE II

A primer composition was prepared by mixing together 12.42 grams of methacryloxypropyltrimethoxysilane and 13.61 grams of tetrabutyltitanate in 200 grams of 2-propanol containing 1.35 grams of water for 15 minutes. The primer solution thus prepared was used as follows. Clear float glass samples were cleaned, and one surface of each coated with the primer. A clear vinyl interlayer was assembled between the primed glass surfaces. The assembly was vacuum sealed in a bag and placed in an autoclave at 275° F. (about 135° C.). The primer improves adhesion between the glass and the vinyl.

The above examples are offered only to illustrate the present invention. Various other organosilane and titanate compounds such as titanium isopropoxide may be hydrolyzed and reacted in various concentrations and solvents to form titanate/organosilane primers in accordance with the present invention. The primers of the present invention may be used to enhance adhesion of a variety of materials in addition to polyacrylate substrates, vinyl interlayers and metal oxide films, such as polycarbonates, polysilicates and polysiloxanes. Similarly, release agents of the present invention may be used to prevent adhesion of a variety of materials, depending on the organo-functional group of the silane. The scope of the present invention is defined by the following claims.

We claim:

1. A laminated product comprising:
   a. a rigid substrate selected from the group consisting of glass, polyacrylates and polycarbonates;
   b. an elastomeric interlayer adhered to said substrate; and
   c. between said polymeric substrate and said elastomeric interlayer, a primer comprising titanate/organosilane copolymer consisting essentially of the reaction product of a titanium alkoxide and an organosilane of the general formula $R_xSi(OR')_{4-x}$ wherein R is an orgnaic radical and R' is an alkyl radical.

2. A laminated product according to claim 1, wherein said rigid substrate is stretched acrylic.

3. A laminated product according to claim 1, wherein said interlayer is a vinyl polymer.

4. A laminated product according to claim 1, wherein said primer is a reaction product of titanium tetraalkoxide and trialkoxyorganosilane.

5. A coated product comprising:
a. a rigid organic polymeric substrate;
b. an inorganic coating on said substrate; and
c. between said substrate and said coating a primer comprising a titanate/organosilane copolymer consisting essentially of the reaction product of a titanium alkoxide and an organosilane of the general formula $R_xSi(OR')_{4-x}$ wherein R is an organic radical and R' is an alkyl radical.

6. A laminated product according to claim 4, wherein said titanium tetraalkoxide is tetrabutylititanate.

7. A laminated product according to claim 6, wherein said trialkoxyorganosilane is methacryloxypropyltrimethoxysilane.

8. A coated product according to claim 5, wherein the substrate is selected from the group consisting of polyacrylates and polycarbonates.

9. A coated article according to claim 8, wherein the inorganic coating is selected from the group consisting of metals and metal oxides.

10. A coated article according to claim 9, wherein the primer comprises a copolymer consisting essentially of the reaction product of a titanium tetraalkoxide and a trialkoxyorganosilane.

11. A coated article according to claim 10, wherein said titanium tetraalkoxide is tetrabutyltitante.

12. A coated article according to claim 11, wherein said trialkoxyorganosilane is methacryloxypropyltrimethoxysilane.

* * * * *

UNITED STATES PATENT AND TRADEMARK OFFICE
CERTIFICATE OF CORRECTION

PATENT NO. : 4,743,503
DATED : May 10, 1988
INVENTOR(S) : Chia-Cheng Lin and Thomas G. Rukavina It is certified that error appears in the above-identified patent and that said Letters Patent is hereby corrected as shown below:

Claim 1c (column 2, line 59), "orgnaic" should read "organic".

Claim 6 (column 3, line 11), "tetrabutylititanate" should read "tetrabutyltitanate".

Claim 11, (column 4, line 12), "tetrabutyltitante" should read "tetrabutyltitanate".

Signed and Sealed this

Eleventh Day of October, 1988

*Attest:*

DONALD J. QUIGG

*Attesting Officer*     *Commissioner of Patents and Trademarks*